June 12, 1923.
P. F. VOKAL
LATHE TOOL HOLDER
Filed Oct. 10, 1919
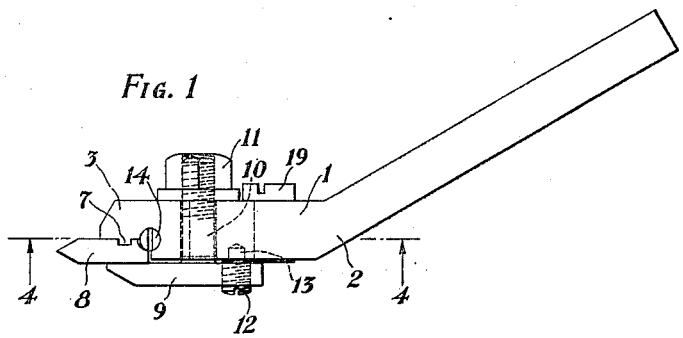
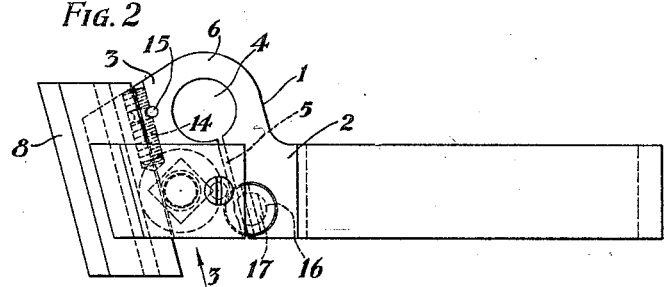
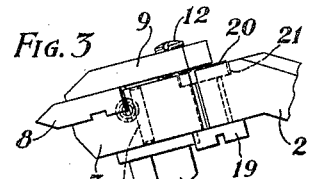
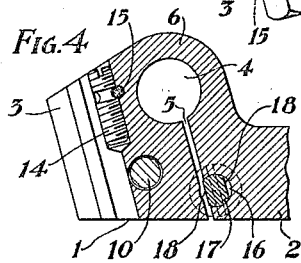 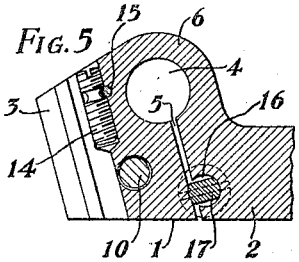
Inventor
Paul F. Vokal
By S. Jay Teller
Attorney Patented June 12, 1923.

1,458,633

UNITED STATES PATENT OFFICE.

PAUL F. VOKAL, OF HARTFORD, CONNECTICUT, ASSIGNOR TO PRATT & WHITNEY COMPANY, OF NEW YORK, N. Y., A CORPORATION OF NEW JERSEY.

LATHE TOOL HOLDER.

Application filed October 10, 1919. Serial No. 329,839.

*To all whom it may concern:*

Be it known that I, PAUL F. VOKAL, a citizen of the United States, residing at Hartford, in the county of Hartford, and State of Connecticut, have invented certain new and useful Improvements in Lathe Tool Holders, of which the following is a specification.

The invention relates particularly to a tool holder which is adapted for holding a small lathe tool especially a tool such as is used for cutting screw threads. The tool holder is of the spring head type and one of the objects of the invention is to provide a tool holder of this type having improved means whereby the normal resilient action of the head may be optionally prevented, the head being locked and the tool being thus converted into a rigid one. A further object of the invention is to provide means whereby the resiliently mounted head is accurately held in register with the shank of the tool, this means being in conjunction with the means for locking the head and preventing resilient action.

Of the accompanying drawings which illustrate the embodiment of the invention which I now deem preferable:

Figure 1 is a plan view.

Fig. 2 is a side view.

Fig. 3 is a bottom view taken in the direction of the arrow 3 in Fig. 2.

Fig. 4 is a fragmentary sectional view taken along the line 4—4 of Fig. 1.

Fig. 5 is a view similar to Fig. 4 but showing the locking mechanism adjusted for preventing resilient action.

Referring to the drawings, 1 represents the body of the tool holder, this comprising a shank portion 2 and a head portion 3. Between the shank and the head there is formed a large aperture 4 and a narrow slot or kerf 5, thus leaving a narrow neck 6 which resiliently connects the head 3 with the shank 2.

The head 3 is provided with suitable devices for engaging and holding a cutting tool and so far as the present invention is concerned, these devices may be widely varied. As illustrated, the head is formed with an integral tongue 7 adapted to enter a suitable groove in a cutting tool 8, which as illustrated may be a threading tool. For holding the cutting tool in engagement with the main part of the head, I provide a strap 9 having a stud 10 formed integral therewith. This stud is threaded and is engaged by a nut 11. The outer end of the strap engages the cutting tool 8 and near the inner end of the strap there is provided a screw 12 having a reduced end 13 which enters a small aperture in the head. By properly adjusting the screw 12 the strap 9 is held spaced from the main part of the head by a suitable distance, this distance varying in accordance with the thickness of the cutting tool which is being held. It will be seen that by tightening the nut 11 on the stud 10, the strap can be forced against the cutting tool to firmly hold it.

In order that the cutting tool may be readily adjusted, I preferably provide a screw 14 which enters an aperture in the head and which engages segmental threads formed on the inner corner of the cutting tool. A pin 15 extending through the head and entering an annular groove in the screw prevents the screw from moving longitudinally. It will be seen that by first loosening the nut 11 and then rotating the screw 14, the cutting tool can be adjusted upward or downward as desired.

Formed in the body of the tool holder is a cylindrical aperture 16 parallel to and intersecting the slot 5, the major portion of the aperture preferably being within the shank 2. Preferably, as shown, the aperture 16 is horizontal, but as to this, there may be variation. Extending into and preferably entirely through the aperture 16 is a stud 17, this stud being rotatably mounted. At least one side of the stud is flattened as shown at 18, and preferably both sides are so flattened. When the stud is positioned as shown in Figs. 2 and 4, the head 3 is resiliently held by the neck 6 and resilient action is permitted. When the stud 17 is turned to the position shown in Fig. 5, the head 3 is engaged and resilient action is prevented, the tool then becoming, for practical purposes, a rigid one.

For turning the stud 17 there is preferably provided a slotted head 19, this head 19 engaging the shank 2 and the head 3 at one side thereof. Preferably, there is provided a washer or collar 20 which is riveted or otherwise secured to the opposite end of the stud 17 and which is entered in a recess 21 formed in the body of the tool concentric with the aperture 16. This recess 21 is somewhat larger than the collar 20 so as not to interfere with the resilient action of the head 3. The collar 20 closely engages the bottom of the recess 21 and in cooperation with the head 19 serves to accurately hold the head 3 and the shank 2 in register with each other. The head may move forward and backward under the control of the resilient neck 6 but any lateral movement of the head is entirely prevented.

From the foregoing description it will be seen that I have provided a simple and compact construction which not only serves to lock the spring head when desired but which preferably also serves at all times to hold the spring head in exact register with the shank.

What I claim is:

1. In a lathe tool holder, the combination of a body comprising a shank and a spring head formed integrally with an open ended slot betwen them, the said body having an aperture extending transversely thereof, and an element adjacent the open end of the slot entirely supported in the aperture and rotatably movable therein to one position to permit resilient action of the head and to another position to prevent such resilient action.

2. In a lathe tool holder, the combination of a body comprising a shank and a spring head formed integrally with an open ended slot betwen them, the said body having an aperture parallel to and intersecting the slot near the open end thereof, and a stud mounted in the aperture and having one side flattened whereby the stud when in one position permits resilient action of the head and when in another position prevents such movement.

3. In a lathe tool holder, the combination of a body comprising a shank and a spring head formed integrally, there being provided between the shank and the head a relatively large transverse aperture and a narrow slot open at one end and connected with the aperture at the other end, the said body having a horizontal cylindrical aperture parallel to and spaced from the first said aperture and parallel to and intersecting the slot, and a stud mounted in the last said aperture and having one side flattened whereby the stud when in one position permits resilient action of the head and when in another position prevents such movement.

4. In a lathe tool holder, the combination of a body comprising a shank and a spring head formed integrally, there being provided between the shank and the head a relatively large transverse aperture and a narrow slot open at one end and connected with the aperture at the other end, the said shank having a horizontal cylindrical aperture parallel to and spaced from the first said aperture and parallel to and intersecting the slot, and a stud mounted in the last said aperture and having one side flattened whereby the stud when in one position permits resilient action of the head and when in another position prevents such movement.

5. In a lathe tool holder, the combination of a body comprising a shank and a spring head formed integrally, there being provided between the shank and the head a relatively large transverse aperture and a narrow slot open at one end and connected with the aperture at the other end, the said body having a horizontal cylindrical aperture parallel to and spaced from the first said aperture and parallel to and intersecting the slot, and a stud rotatably mounted in the last said aperture and having one side flattened whereby the stud when in one position permits resilient action of the head and when turned to another position prevents such movement.

6. In a lathe tool holder, the combination of a body comprising a shank and a spring head formed integrally with an open ended slot between them, the said body having a horizontal cylindrical aperture parallel to and intersecting the slot near the open end thereof, a stud rotatably mounted in the aperture and having one side flattened whereby the stud when in one position permits resilient action of the head and when in another position prevents such movement, and heads on the stud for holding the head and shank in register.

In testimony whereof, I hereto affix my signature.

PAUL F. VOKAL.